J. G. HANNA.
AEROPLANE.
APPLICATION FILED NOV. 15, 1910.
1,081,828.
Patented Dec. 16, 1913.
2 SHEETS—SHEET 2.
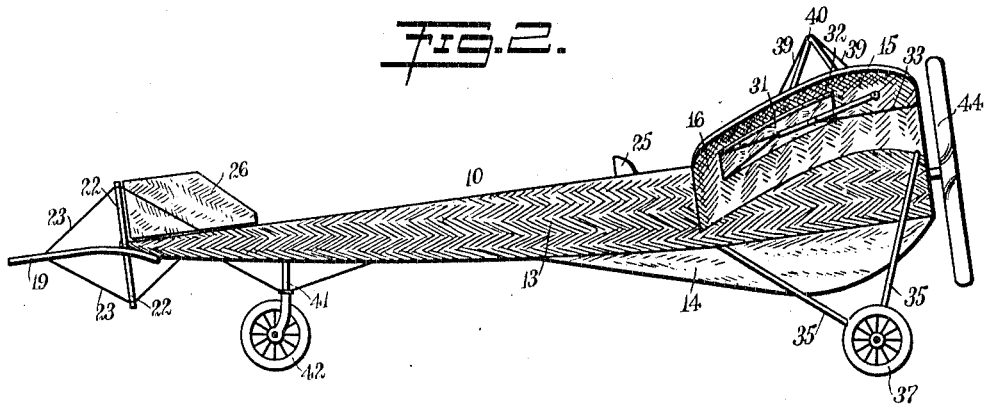
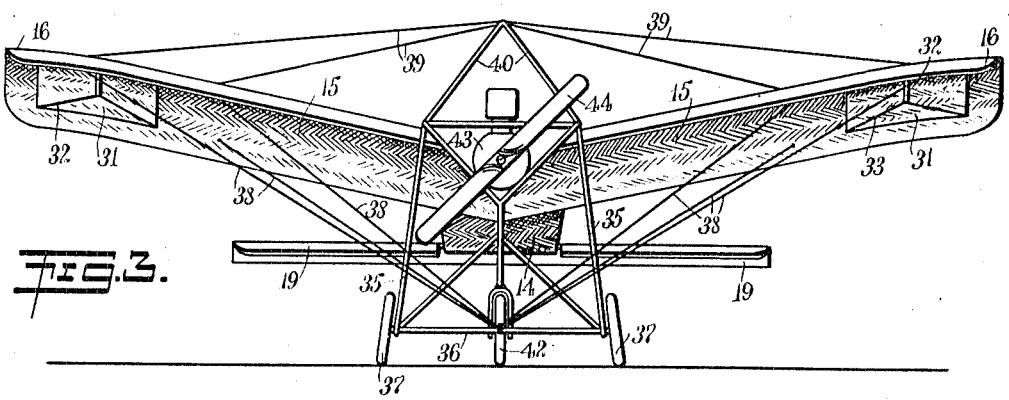
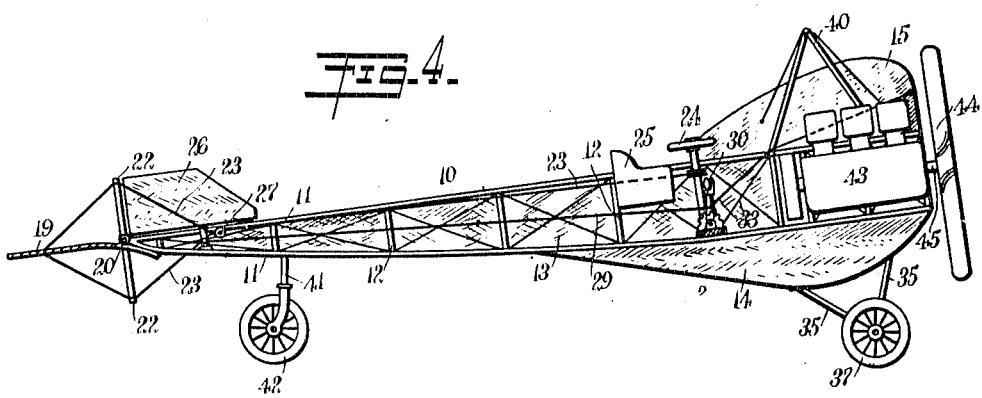
WITNESSES:
G. Robert Thomas
P. A. Hoster
INVENTOR
John G. Hanna
BY
ATTORNEYS

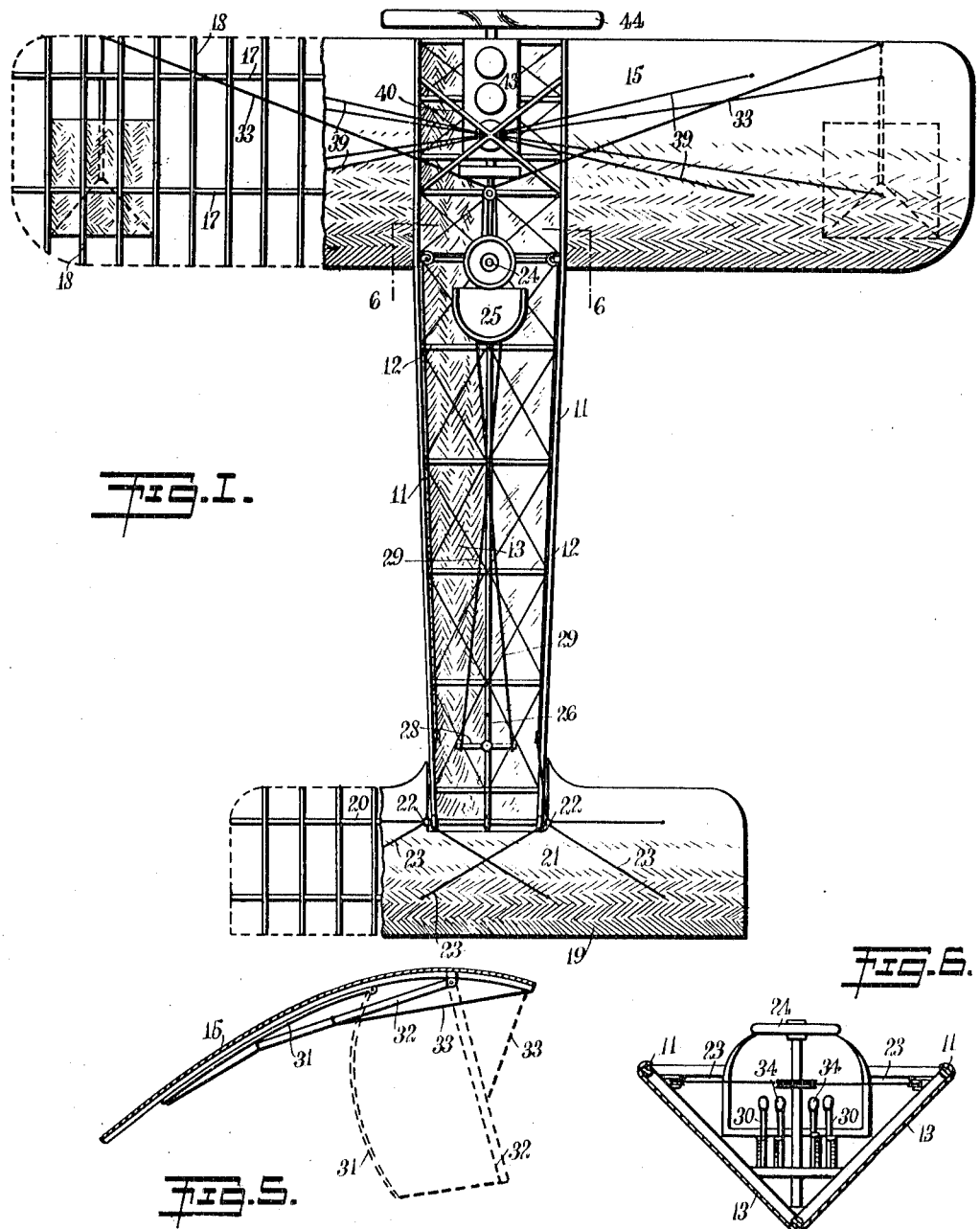

UNITED STATES PATENT OFFICE.

JOHN G. HANNA, OF GALVESTON, TEXAS.

AEROPLANE.

1,081,828.    Specification of Letters Patent.    Patented Dec. 16, 1913.

Application filed November 15, 1910. Serial No. 592,440.

*To all whom it may concern:*

Be it known that I, JOHN G. HANNA, a citizen of the United States, and a resident of Galveston, in the county of Galveston and State of Texas, have invented a new and Improved Aeroplane, of which the following is a full, clear, and exact description.

The invention relates to aeroplanes, and has for an object to provide a device for sustaining weight, and moving the same through air by atmospheric reaction on a curved surface or surfaces impelled either by a force of gravity or by mechanical power, and for insuring stability, great strength and the power of absolute control at all times.

To accomplish the desired result I embody a fuselage or body member provided with a plurality of movable planes, means for operating the said planes, a rudder for guiding the said fuselage, wind brakes for turning and tilting and operating means for substantially controlling and operating the said wind brakes.

Reference is to be had to the accompanying drawings, constituting a part of this specification, in which similar characters of reference denote corresponding parts in all the views, and in which—
Figure 1 is a plan view of my aerial device. Fig. 2 is a side elevation; Fig. 3 is a front elevation; Fig. 4 is a longitudinal section disclosing the various bracing members and operating gear; Fig. 5 is a detailed sectional side view of the wind brake of my device; and Fig. 6 is a sectional view taken on the line 6—6 in Fig. 1 and showing the steering wheel and controlling levers.

In the operation of aeroplanes and similar aerial machines, one of the most important features to be taken into consideration is the tilting angle that can be obtained, especially when it is desired to negotiate a turn, without in any manner endangering the stability of the machine. Numerous known aeroplanes accomplish this result by operating the planes to warp the same, and by manipulating the rudder to preserve stability. Furthermore, in some aeroplanes, the operation of the planes and rudder when describing a curve are relatively automatic, and should an unfavorable current of wind strike a machine at the particular moment of turning, it has been found that the gravi-
tational stability of the machine has been overcome by the current of wind, and serious accidents have resulted.

In my device I provide a wind brake adapted to safely permit of tilting the machine and particularly efficient, when a curve is described, in that the stability of the machine is at all times preserved. With my wind brake and the various operative parts of my aeroplane, I have provided a device controllable at the will of the operator and adapted to preserve its stability in describing a turn, by the independent or automatic concentration of the various parts, each to a particular object advantageously applied in making the desired turn.

Referring more particularly to the various views, I employ a fuselage or body member 10, consisting of longitudinally extending rods 11, placed so that they form a triangle at the front end and with the lower rod 11 bent upwardly at the rear of the fuselage to connect with the upper rods 11. The rods 11 are connected by struts 12 conveniently spaced throughout the length of the fuselage 10 and suitably trussed with wire or cord, as will be seen in Figs. 1 and 4. The entire outer surface of the fuselage is covered with a suitable fabric 13 and the top of the fuselage may also be covered with the mentioned fabric.

On the under side of the fuselage 10, a fin keel 14 is secured and extends vertically downward. On both sides of the fuselage 10 at the front end thereof, parabolically curved main planes 15 are secured and extend laterally outwardly and upwardly with the lips 16 of the planes slightly curved. To strengthen the planes 15, a plurality of rods 17 are provided with suitable cross brace rods 18 and the said rods 17 and brace rods 18 are covered with a suitable material to constitute the planes 15.

At the rear end of the fuselage 10, a parabolically curved rear plane 19 is mounted with the main rod 20 thereof hingedly mounted on the fuselage 10 at the intersection of the rods 11 and the outer sides of the planes covered with a material or fabric 21. Suitable struts 22 are mounted to extend laterally through the plane 19 and serve the double purpose of trussing the plane and of moving it on its hinges by means of cords 23 passed through suitable guides or pulleys to a steering wheel 24 mounted immediately in front of an operator's seat 25 on the fuselage 10, and by means of which the angle of incidence of the rear plane 19 can be easily controlled. Above the fuselage 10 at the rear end thereof, I provide a vertical rudder 26 pivoted at a point 27 on the fuselage 10, and provided with a yoke 28 connected by diagonally crossed wires 29 to a pair of levers 30, one of the said levers being disposed beneath the steering wheel 24 on both sides thereof.

To the underside of each main plane 15 is attached a wind plane 31, of flexible spring steel or the like, covered with fabric and attached to the plane 15 at the forward edge only. Cords 33 are secured to the said planes 31 by means of sprits 32 and connected with levers 34 mounted in close proximity to the levers 30 on both sides of the steering wheel 24. Normally the wind planes 31 and sprits 32 will be flat against the under surface of the plane 15, and thus do not present any added resistance to the wind. When the levers 34 are operated, however, the sprits are pulled downwardly, and in turn extend the planes 31 to a position approximately perpendicular to the line of travel with the said planes 31 slightly concave in shape, thus affording a positive resistance for the air.

At the upper front end of the fuselage 10, bars 35 project downwardly therefrom, and are connected by an axle 36 on which suitable pneumatic wheels 37 are mounted. A series of truss wires 38 are secured to the underside of the planes 15 and are connected to the axle 36, and a second series of truss wires 39 are secured to the upperside of the planes 15 and connected to a framework 40 built to extend upwardly over the fuselage 10, and act as a brace for the main planes 15. At the rear end of the fuselage a fork 41 is mounted to depend from the fuselage, and a wheel 42 is mounted on the said fork. Thus it will be seen that the wheels 37 and 42 mounted as mentioned constitute my preferred alighting gear although it will be understood that suitable skids or the like can also be employed.

At the front end of the fuselage 10 is positioned an engine 43 adapted to operate a propeller 44 for transmitting motion to my aeroplane, the said propeller being secured to an engine shaft 45 at the front end of the fuselage.

Although the dihedral angle of the planes 15 is a well known means for insuring automatic stability, the tendency of the planes to oscillate when disposed at the mentioned angle is very pronounced, and to overcome this objection I have provided the rear plane 19. The V-sections forward of fast motor boats invariably cause a rocking motion which can be entirely corrected by a wide, flat stern. Thus, when my machine is tilted, the side of the fuselage 10 presents a flatter surface to the tilting air current and in this manner tends to force the planes 15 downward, aided by the fin keel 14, and it is obvious that this fin may be so adjusted in areas as to exactly balance the effects of the side currents. Incidentally the fin keel 14 will also act to prevent sidewise slipping or skidding in the air and will assist in steering a straight course. The plane 19, although mounted to control the upward or downward motion of the machine, also performs the function of a supporting plane, being of sufficient area to carry most, if not all, of the weight of the aviator. Thus, it will be readily seen that the plane 19 is not merely a horizontal rudder and does not act merely by the reaction of the air, as is the case with most known aeroplanes. When the controlling wheel 24 is manipulated to change the angle of incidence of the rear plane 19, its lift increases or decreases and this is substantially equivalent to shifting the center of gravity of the whole apparatus forward or backward, consequently pointing the aeroplane upward or downward.

When it is desired to negotiate a turn with my device, it is only necessary to draw back the lever, situated on the side of the machine toward which the machine is to be pointed and this operation moves the wind plane 31 on the same side, to a position in a plane approximately perpendicular to the longitudinal axis of the fuselage 10, thus presenting a wind resistance which tends to check the mentioned side of the aeroplane and at the same time permits the other side of the aeroplane to swing around and describe a circle by the forward action of the propeller. When the forward advance of one plane 15 is checked, as mentioned, its lift consequently decreases, allowing it to drop and the corresponding increase in speed of the other plane, as it swings around the outside of the circle whose center is the wind plane 31, provides a greater lift. It will now be seen that the necessary tilt at the turn is automatically produced, and the greater the speed at the point of turning will result in a greater lift.

From the foregoing description it will be seen that with my aeroplane I can negotiate a turn without actuating the rudder 26 which is preferably adapted when steering a straight course.

The use of three longitudinal members in the fuselage is a common expedient in many machines but the method of bringing the ends of the members together in the same horizontal line at the rear, constitutes a feature that has not been heretofore disclosed.

The levers 30 and 34 for operating the rudder 26 and the wind planes 31 are arranged so that two of the levers can be operated simultaneously with one hand thus insuring ease in the manipulation of the various parts of my device and efficiency in the action thereof.

Although for the purpose of describing my aeroplane, I have shown a particular construction, it will be understood that the scope of the invention is defined in the appended claims.

Having thus described my invention, what I claim as new and desire to secure by Letters Patent is:—

1. In an aeroplane, the combination of a covered fuselage or body member consisting of three main longitudinal members forming a triangle at their forward ends and having their rear ends in a horizontal line, a horizontal guiding plane mounted to swing on the rear line of meeting of the said longitudinal members and supporting planes at the forward end of the fuselage or body member.

2. In an aeroplane, the combination of a covered fuselage or body member consisting of three main longitudinal members forming a triangle at their forward ends with the apex downward, the rear end of the lower member being bent upwardly between and in the same horizontal line with the rear ends of the upper members, a horizontal guiding plane mounted to swing on the rear line of meeting of said longitudinal members, and supporting planes at the forward end of the fuselage or body member.

3. In an aeroplane, the combination of a fuselage or body member, supporting planes at the forward portion of said fuselage or body member, flexible inelastic members secured at their forward edges to the lower side surfaces of the said supporting planes and adapted to normally assume positions flat-wise against the planes, and connections for independently moving the said flexible inelastic members to positions substantially perpendicular with respect to the supporting planes.

4. In an aeroplane, the combination of a covered fuselage or body member consisting of three main longitudinal members forming a triangle at their forward ends and having their rear ends in a horizontal line, a horizontal guiding plane mounted to swing on the rear line of meeting of the said longitudinal members, supporting planes at the forward end of the fuselage or body member and wind brakes movably attached to the under side of the said supporting planes near their outer ends.

5. In an aeroplane, the combination of a covered fuselage or body member consisting of three main longitudinal members forming a triangle at their forward ends with the apex downward, the rear end of the lower member being bent upwardly between and in the same horizontal line with the rear ends of the upper members, a horizontal guiding plane mounted to swing on the rear line of meeting of said longitudinal members, supporting planes at the forward end of the fuselage and wind brakes consisting of flexible members movably attached to the under side of the said supporting planes adjacent to their outer ends.

6. In an aeroplane, the combination of a fuselage or body member, supporting planes at the forward portion of the said fuselage or body member, flexible inelastic members secured at their forward edges to the lower surfaces of said supporting planes and adapted to normally assume positions flatwise against the planes, sprits hinged at their upper ends to the lower surfaces of the planes forwardly of the wind brakes, connections between the lower ends of the sprits and the lower ends of the wind brakes and connections for independently actuating the said sprits whereby to cause the respective wind brakes to assume positions substantially perpendicular with respect to the planes.

7. In an aeroplane, the combination of a covered fuselage or body member consisting of three main longitudinal members with their forward ends placed triangularly, apex downward, and their rear ends lying in a horizontal line, a vertical fin keel attached to the bottom longitudinal member forwardly, a horizontal guiding plane mounted to swing on the rear line of meeting of the three longitudinal members, and means in the fuselage for changing the angle of incidence of said guiding plane.

8. In an aeroplane, the combination of a covered fuselage or body member consisting of three main longitudinal members with their forward ends placed triangularly, apex downward, and their rear ends lying in a horizontal line, a plurality of supporting planes secured at a dihedral angle to the forward part of the fuselage, flexible wind brakes operatively attached to the under side of said dihedrally-set supporting planes, a horizontal guiding and sustaining plane mounted to operate on the line of meeting of the rear ends of the longitudinal fuselage members, means on the fuselage for operating the said wind brakes, and means for operating the said guiding plane.

9. In an aeroplane, the combination of a covered fuselage or body member consisting of three main longitudinal members with their forward ends placed triangularly, apex downward, and their rear ends lying in a horizontal line, a plurality of supporting planes secured at a dihedral angle to the fuselage at the forward part thereof, a vertical fin keel secured to the bottom member of the fuselage below the supporting planes, flexible wind brakes attached to the under side of each of the said dihedrally-set supporting planes, a horizontal guiding and sustaining plane operatively mounted on the line of meeting of the rear ends of the said longitudinal fuselage members, a rudder mounted on the fuselage adjacent to said horizontal plane, means for operating said wind brakes, means for operating said guiding plane, and means for operating said rudder.

In testimony whereof I have signed this specification in the presence of two subscribing witnesses.

JOHN G. HANNA.

Witnesses:
F. A. HOSTER,
PHILIP D. ROLLHAUS.